March 20, 1962     D. F. ROERTY     3,026,165
RECORDER WITH HELICAL INK TUBE

Filed Aug. 13, 1958     3 Sheets-Sheet 1

Fig. I

WITNESSES

INVENTOR
Dennis F. Roerty
BY
ATTORNEY

United States Patent Office 3,026,165
Patented Mar. 20, 1962

3,026,165
RECORDER WITH HELICAL INK TUBE
Dennis F. Roerty, Carteret, N.J., assignor to Westinghouse Electric Corporation, East Pittsburgh, Pa., a corporation of Pennsylvania
Filed Aug. 13, 1958, Ser. No. 754,774
8 Claims. (Cl. 346—140)

This invention relates to electrical measuring instruments and has particular relation to instruments of the recording type.

Recording instruments have previously been constructed to record variable electrical quantities such as voltage and current. In such instruments, a measuring device including a movable part is ordinarily provided for actuating a suitable indicator, such as a pen, which imposes markings upon a suitable chart for indicating the measured quantity.

When a pen is utilized, it is necessary to provide means for supplying ink to the pen. This has been accomplished in the past by providing an ink container with flexible tubing leading from the container to the pen with the tubing connected between the pen and ink container for movement with the pen.

With such arrangement, a number of problems arise. For example, the problem arises as to the effect upon movement of the pen imposed by unpredictable movements of the flexible tubing. This problem is particularly troublesome in instruments employing a pen which is directly connected to the movable part of the measuring device. Such instruments may be referred to as direct acting instruments. In such direct acting instruments relatively low values of torque are applied to the pen as compared to the torque applied in instruments of the indirect acting type wherein torque amplifying devices, such as linkages, are interposed between the pen and the movable part.

When such flexible tubing is utilized in instruments of the direct acting type, it has been noted that the tubing applies torque to the pen which constitutes an appreciable percentage of the total torque applied to the pen. It has been further observed that the torque applied by the tubing to the pen for a given energization of the measuring device may vary considerably due to inconsistent and non-repetitious movements of the tubing resulting from twisting and bending of the tubing in response to repeated movements of the pen. It has been further noted that such torque variations not only result in undesirable movements of the pen relative to its associated chart but also adversely affect the calibration of the instrument.

In addition, it has been observed that plastic tubings employed in recording applications possess certain inherent undesirable characteristics which adversely affect the operation of recording instruments. For example, such plastic tubing exhibits permeability to gases which may result in failure of the inking system due to the formation of air bubbles in the tubing. Further, plastic tubing is observed to exhibit a so-called "memory" effect whereby in recorder applications the recorder indication varies as a function of time.

According to the present invention, a recording instrument is provided including improved means for supplying ink to a pen assembly from an ink container. In the present invention, a recording instrument is provided with flexible metallic tubing supplying ink from an ink container with the tubing arranged so as to be movable with the pen along a predetermined and repetitious course to substantially eliminate undesirable effects of movements of the tubing upon movements of the pen.

A previous construction has also employed a sealed inking system which includes a compressible sealed plastic sack as an ink container. When this construction is utilized, the flow of ink may be initiated by compressing the sack to force ink from the sack through the tubing into the pen. Heretofore, considerable difficulty has been experienced in initiating the ink flow due to numerous and cumbersome operations involved in manipulating portions of the recorder mechanism to expose the sack and in handling the sack to effect compression thereof.

In the present invention, a recording instrument is provided including an inking system having a compressible ink sack with improved means for compressing the sack to initiate ink flow without disturbing the instrument mechanism and without handling of the sack. Such means preferably includes a manually actuable plunger which is actuable by an operation performed at the front of the instrument.

When an inking system as described is utilized, the further problem arises as to the manner of mounting the ink sack to prevent accidental displacement thereof. For example, considerable difficulty has previously been encountered in mounting the sack in its operative position to prevent displacement of the sack therefrom during shipment of the instrument.

According to the invention improved means are provided to securely mount the compressible sack in an operative position against accidental displacement. Such means may include a resilient part which is normally biased against a portion of the sack to mount the sack and which is readily deflectable from its sack-mounting position to a position permitting rapid removal of the sack from its mounted position. Preferably, the sack compressing means and the sack-mounting means include common parts.

In a preferred embodiment of the invention, a direct acting recording instrument is provided including a measuring device having a part rotatable about an axis in response to energization of the device. A pen assembly is directly connected to the moving part for rotation therewith about the axis of the moving part. The tubing is formed of a metallic material and includes a portion intermediate its ends which is curved about the axis of the movable part.

According to the present invention, the tubing is in the form of a spring preferably of helical configuration having ends connected respectively to a stationary support and to the movable assembly. This arrangement results in consistent and repetitious movements of the tubing along a predetermined course in response to repeated movements of the pen. The torque applied to the pen by the tubing is, therefore, substantially constant for a given energization of the measuring device and may be substantially compensated in the calibration of the instrument.

The pen assembly is further mounted for pivotal movement about an axis which is transverse to the axis of the rotatable part. The invention provides further that the tubing is connected to the pen along a line which is common to the axis of pivotal movement of the pen.

The sack compressing and mounting means preferably includes a pair of resilient members each mounted for deflection towards and away from the other. These members include portions which are normally biased towards each other to pinch an ink-free portion of the sack for retaining the sack against accidental displacement.

In order to compress the sack to initiate ink flow, one of the members is deflected against the ink-filled portion of the sack to simultaneously move the associated pinching portion away from its pinching position and to force ink from the sack through the sack neck into the tubing. The sack may be freed from its captive position by deflecting the other member to move its pinching portion away from its pinching position.

It is, therefore, an object of the invention to provide a recording instrument including a measuring device for actuating a recording pen with improved means for supplying ink to the pen from an ink container.

It is another object of the invention to provide a recording instrument including a measuring device for actuating a recording pen with flexible metallic tubing supplying ink from an ink container to the pen with the tubing mounted and arranged such that movements of the tubing in response to repeated movements of the pen are consistent and repetitious.

It is still another object of the invention to provide a direct acting recording instrument including a measuring device having a movable part directly connected to a recording pen with flexible helical metallic tubing supplying ink to the pen from an ink container such that the torque applied to the pen by the tubing is substantially constant for a given energization of the measuring device.

It is a further object of the invention to provide a recording instrument including a measuring device for actuating a recording pen with tubing supplying ink from a compressible sealed ink container to the pen with improved means for compressing the container to initiate the flow of ink from the container through the tubing to the pen.

It is a still further object of the invention to provide a recording instrument including a measuring device for actuating a pen with flexible tubing connected between the pen and a compressible sealed ink container with improved means for mounting the container against accidental displacement.

Other objects of the invention will become apparent from the following description taken in conjunction with the accompanying drawings, in which.

Figure 2:
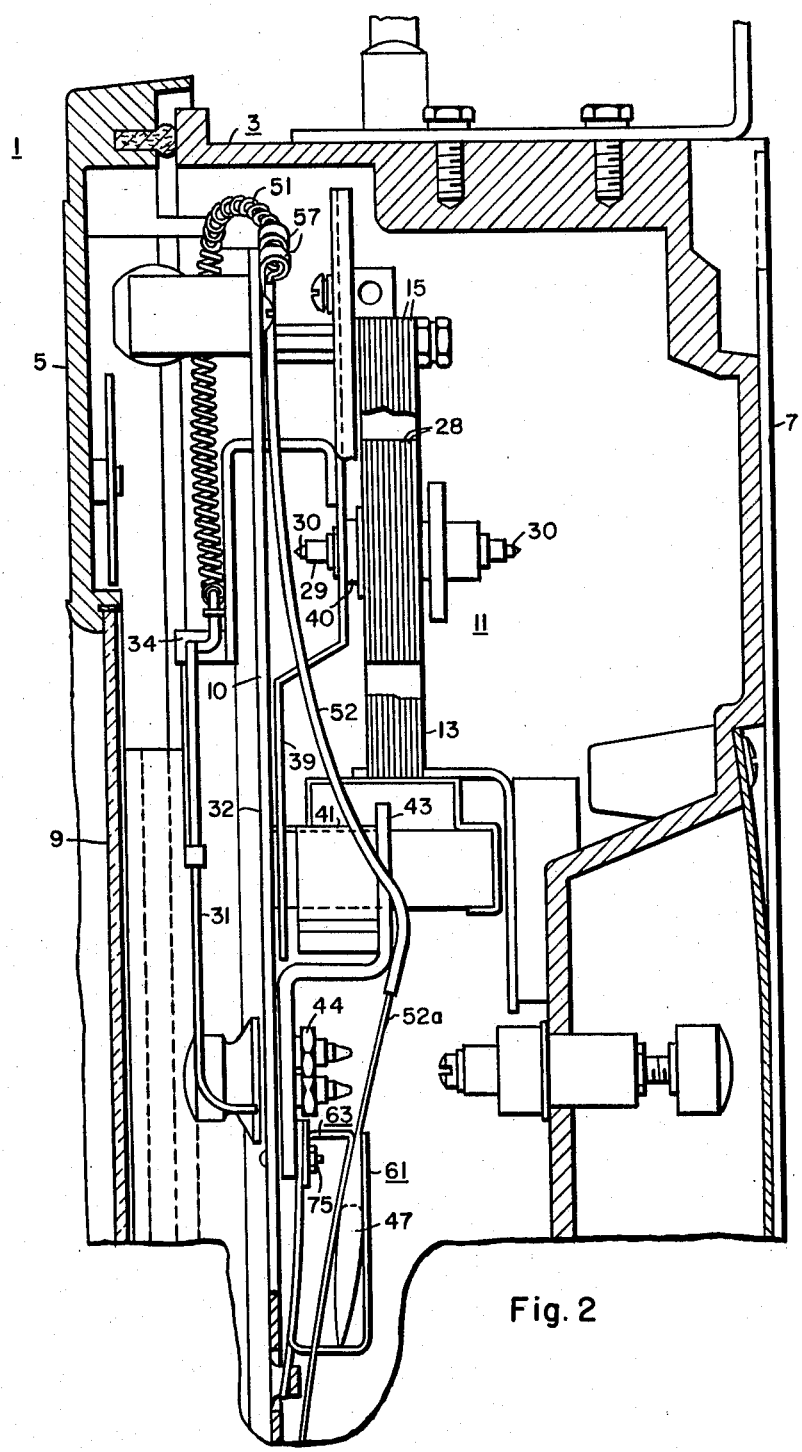
FIG. 2 is a view in side elevation of the instrument of FIG. 1 with parts broken away, with parts removed and with parts shown in section.

Referring now to the drawings, there is illustrated a recording instrument for recording a variable electrical quantity such as voltage or current. The instrument is represented generally by the numeral 1 and includes a casing 3 within which operating parts of the instrument are contained as best shown in FIG. 2. The casing 3 includes a front cover section 5 which is removably associated with a rear supporting section 7. The front section 5 includes a transparent window 9 through which parts of the instrument supported by a plate 10 within the section 7 may be observed.

The instrument includes a measuring device 11 which may be of any suitable construction. In the embodiment illustrated, the device 11 includes a magnetic structure 13 preferably formed of a plurality of magnetic laminations 15, each having the configuration illustrated in FIG. 1. The laminations 15 may be constructed of any suitable magnetic material, such as silicon steel, and are fastened together in any suitable manner as by bolts 16. The structure 13 includes a rim portion 17 having an inner periphery from which extend a pair of spaced opposed poles 19 and 21. A pair of windings 23 and 25 surround respectively the poles 19 and 21.

The device 11 is shown in the form of a moving iron instrument having a movable part such as a rotatable armature 27. This armature may be constructed in any suitable manner. Conveniently, the armature may be formed of a plurality of magnetic laminations 28 of soft iron or steel which are fastened together in any suitable manner. The armature may be mounted in the space between the poles 19 and 21 by a shaft 29 for rotation about the shaft axis relative to the poles. For this purpose, the shaft 29 may have secured thereto suitable bearing pivots 30 adapted to be mounted by suitable bearing screws (not shown).

The windings 23 and 25 are adapted to be connected to a circuit (not shown) for energization in accordance with an electrical quantity to be measured. The windings are so connected that they tend to establish magnetic fluxes which pass between the poles 19 and 21 in the same direction.

For depicting movement of the armature 27, a suitable indicating member, such as a pointer or pen, may be associated therewith. In the embodiment illustrated, a pen 31 is positioned for movement across the face of a suitable chart 32 to impose markings upon the chart. This chart may be constructed of any suitable material and is in the form of a circular disc mounted for rotation about its axis at a uniform rate by suitable means (not shown). The chart 32 may be designed to rotate at any desired speed. For example, the chart may rotate at the rate of one revolution per week and may be divided into zones each representing one of the days of the week. Each of the zones may be divided further for indicating the hours of each of the days.

The pen 31 is provided with spaced pins 33 for pivotally engaging suitable spaced ears 34 carried by a pen bracket 35. The pen bracket 35 may be supported in any suitable manner for rotation with the armature 27 about the axis of rotation of the armature 27. The pins 33 and ears 34 permit pivotal movement of the pen about an axis transverse to the axis of rotation of the armature.

In order to damp movements of the pen 31, a damping vane may be carried by the shaft 29 for rotation therewith. This damping vane may be formed of an electroconductive material, such as copper or aluminum. The vane 39 is conveniently secured to a hub 40 carried by the shaft 29 for movement between the poles of a permanent magnet 41. As is understood in the art, movement of the vane 39 between the poles develops a force opposing such rotation which is dependent upon the rate of movement of the vane. The magnet 41 is conveniently mounted by a bracket 43 secured to the supporting plate 10 by screw and nut assemblies 44.

The pen 31 is biased by means of a spiral spring 45 toward one end of its path of movement. The spring 45 has its outer end secured to a stationary portion of the instrument and has its inner end secured to the movable pen assembly in any suitable manner.

In order to supply a suitable marking medium such as ink, to the pen 31, a suitable ink container which conveniently may be in the form of a sealed compressible sack 47 is provided. The sack 47 may be formed of any suitable material, such as a plastic material, and is mounted by means described hereinafter. The sack 47 is located such that the ink level is slightly beneath the tip of the pen.

In order to feed ink from the sack 47 to the pen 31, there is provided a suitable length of flexible tubing 51 which extends between the sack 47 and the pen 31. In the past, it has been the practice to utilize tubing formed of a plastic material to feed ink from an ink container to a pen. Although plastic tubing possesses a number of desirable features, it also possesses certain inherent undesirable characteristics which adversely affect the operation of recording instruments. As an example, plastic tubing exhibits permeability to gases which may result in failure of the inking system due to the formation of air or gas bubbles in the tubing.

According to the present invention, the tubing 51 is formed of a suitable metallic material having dimensions which render the tubing flexible and which permit free and unimpeded ink flow through the tubing. The tubing 51 is preferably formed of a spring material. For example, the tubing 51 may be constructed of stainless steel or an alloy of beryllium and copper which are well known spring materials. Such materials are also impermeable to gases, exhibit negligible memory effects and possess negligible temperature coefficients. In the particular embodiment illustrated it is desirable that the tubing 51 have an inner diameter of approximately .015 inch and an outer diameter of approximately .018 inch.

Figure 1:
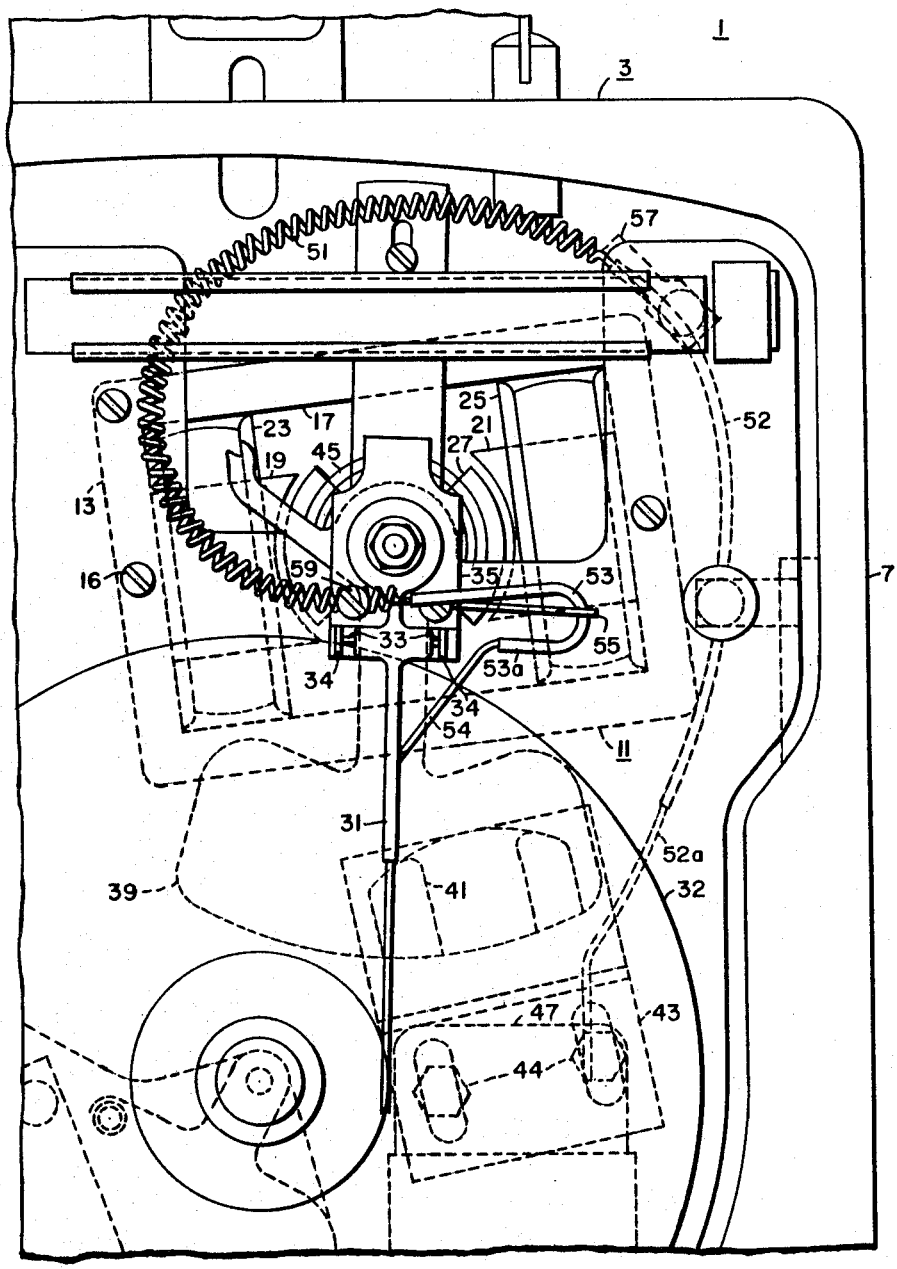
FIGURE 1 is a view in front elevation of a measuring instrument with parts removed and with parts broken away embodying the teachings of the present invention.

One end of the tubing 51 may project into additional tubing 52 which may be formed of a plastic material and which has an end into which projects an end of the sack tubing 52a. The other end of the tubing 51 may extend into plastic tubing 53 which is connected to an extension 54 of the pen 31. A portion of the tubing 51 intermediate the ends is curved substantially about the axis of rotation of the armature 27 as best shown in FIG. 1.

The tubing 53 may be threaded through an opening provided at the free end of a rod 55 which is secured to the bracket 35. It is observed that the adjacent end 53a of the tubing 53 extends along a line which is common to the axis defined by the pins 33 to engage the extension 54 along such line. This arrangement minimizes the effect of the tubing upon the pressure exerted by the pen 31 upon the chart 32. Ink is supplied to the chart 32 by a combination of syphoning action and capillary attraction at the tip of the pen 31. For this purpose the pen tip is formed with a capillary bore.

When tubing of considerable length and flexibility, such as the tubing 51, is utilized to supply ink to the pen 31, it has been observed that unless the tubing is suitably arranged, movements of the tubing in response to repeated movements of the pen will be inconsistent and non-repetitious. It has further been noted that such movements of the tubing may produce undesirable movements of the pen and may also adversely affect calibration of the instrument.

In accordance with the present invention, the tubing 51 is in the form of a spring arranged such that movements of the tubing are consistent and repetitious in response to repeated movements of the pen whereby the affect of the tubing upon the pen may be substantially compensated in the calibration of the instrument. In the preferred embodiment of the invention illustrated, the tubing 51 is of helical formation to provide a spring construction. Other formations may also be employed such, for example, as a zig-zag formation. As illustrated in the drawings, one end of the tubing 51 is secured to the support plate 10 by means of spaced ears 57 which clamp the end of the tubing 51. The other end of the tubing 51 is secured to the pen bracket 35 by means of a screw 59. The arrangement is such that the tubing 51 moves substantially in a plane which is transverse to the axis of rotation of the armature 27. The spring construction of the present invention may be employed to advantage with tubing formed of materials other than metallic materials.

With this spring construction, movements of the tubing 51 caused by repeated movements of the pen 31 are observed to follow a predetermined course in a consistent and repetitious manner. This results in the application of a substantially constant torque by the tubing to the pen for a given energization of the measuring device. As a consequence movements of the tubing do not adversely affect the calibration of the instrument.

In order to initiate the flow of ink from the sack 47 through the intermediate tubing to the pen 31, it has previously been the practice to manually compress the sack to force ink therefrom into the tubing. This procedure involves a number of cumbersome and time consuming operations. For example, it has heretofore been necessary to manipulate certain portions of the recording instrument to expose the sack, remove the sack from its holder, compress the sack to force ink therefrom and finally return the sack to the holder.

In the present invention, means are provided for compressing the sack to initiate ink flow without disturbing the instrument mechanism and without handling of the sack. The invention further provides improved mounting means to securely mount the sack in an operative position against accidental displacement. Preferably, the sack compressing means and the sack mounting means includes common parts.

Figure 3:
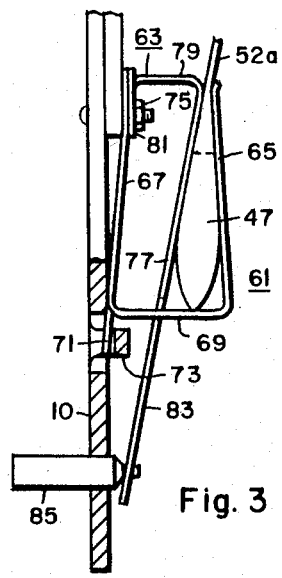
FIG. 3 is a view in side elevation of a portion of the instrument of FIG. 2.
Figure 4:
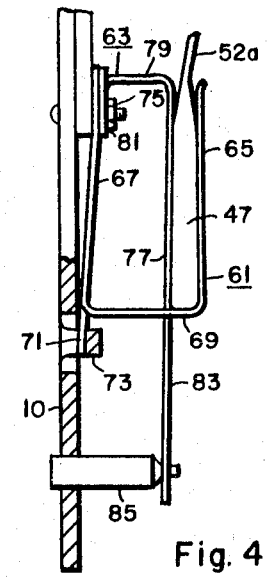
FIG. 4 is a view similar to FIG. 3 illustrating the portion of FIG. 3 in a different condition.
Figure 5:
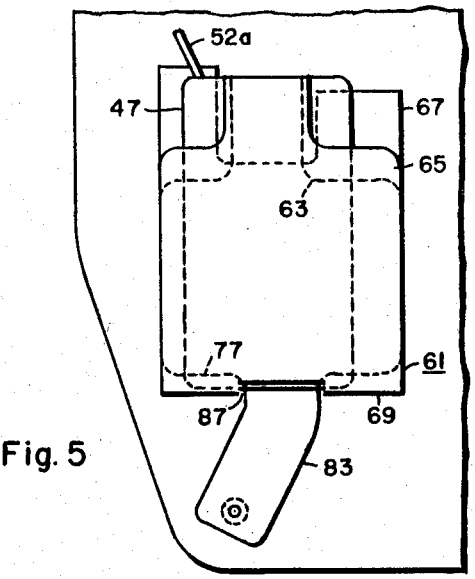
FIG. 5 is a view in rear elevation of the portion shown in FIG. 3.

Referring now to FIGS. 3, 4 and 5, the combination sack compressing and mounting mean is illustrated as including a pair of resilient members 61 and 63 which are each secured for deflection towards and away from the other. The members 61 and 63 are formed of spring material, such as Phosphor bronze, and may be secured to the plate 10.

As shown in FIG. 3, the member 61 is of substantially U-shaped configuration including a pair of spaced plate portions 65 and 67 connected by a base 69. The member 61 is mounted by means of a projection 71 of the plate portion 67 which passes under an extension 73 of the support plate 10, and also by a screw and nut assembly 75 which engages a part of plate portion 67. The plate portion 65 of the member 61 is arranged to cooperate with a plate portion 77 of the member 63 to securely retain the sack 47 in an operative position. The plate portion 77 further serves to compress the sack as will presently appear.

The member 63 is of substantially L-shaped configuraton as viewed in FIG. 3 including the plate portion 77 and a pair of transverse arms 79 and 81. The arm 81 may be secured to the support plate 10 by the assembly 75. As shown in FIG. 5, the plate portion 77 includes an extension 83 which engages a plunger 85 which is slidably mounted in an opening of the support plate 10. In order to permit movement of the plate portion 77 towards and away from the plate porton 65, the base 69 of the member 61 is provided with a slot 87 through which the extension 83 projects as shown in FIG. 5.

In FIG. 3, the sack 47 is illustrated in its normally retained operative position. As there shown, the neck of the sack 47 is normally pinched between the ends of the plate portions 65 and 77 with the sack bottom engaging the base 69 of the member 61. As shown in FIG. 5 the sack-pinching portions of the portions 65 and 77 are clear of the tube 52a to avoid pinching of the tube 52a. In order to permit installation and removal of the sack from its retained position, the plate portion 65 may be deformed from its normal biased position to a position permitting insertion or withdrawal of the sack through the space between the pinching ends of the plate portions 65 and 77.

In order to compress the sack 47 to initiate the flow of ink, it is only necessary to displace the plunger 85 from the position shown in FIG. 3 to the position illustrated in FIG. 4. This action causes movement of the plate portion 77 from its non-compressing position of FIG. 3 to the compressing position shown in FIG. 4. It is noted that as the plate portion 77 moves towards its sack compressing position, the pinching end of the plate portion 77 is moved away from its sack-pinching position so as not to impede the flow of ink from the sack to the tubing. After the ink flow is initiated in the above-described manner, the plunger 85 may be released to return to its normal position shown in FIG. 3 under the bias exerted by the plate portion 77.

Although the invention has been described with reference to certain specific embodiments thereof, numerous modifications are possible, and it is desired to cover all modifications falling within the spirit and scope of the invention.

I claim as my invention:

1. In a recording instrument, a measuring device having a part movable in accordance with a variable quantity to be measured, a recording surface, a pen assembly mounted for rotation relative to said surface in accordance with movement of said part, an ink container spaced from said pen assembly, and means for supplying ink from said container to said pen assembly, said supply means including a tube of resilient construction, said tube including a portion helically wound about an axis, said portion being mounted for flexing of said axis along a predetermined and repetitious path in response to movements of said pen assembly, said helical portion constituting a substantial part of said supply means.

2. In a recording instrument, a measuring device having a part movable in accordance with a variable quantity to be measured, a recording surface, a pen assembly mounted for rotation relative to said surface in accordance with movement of said part, an ink container spaced from said pen assembly, and means for supplying ink from said container to said pen assembly, said supply means including a tube of resilient construction, said tube including a helical portion, the axis of said helical portion being mounted for movement along a predetermined and repetitious path in response to movements of said pen assembly, said helical portion constituting a substantial part of said supply means, said ink container being positioned such that the ink level is slightly beneath the tip of the pen assembly, said tip having a capillary bore whereby ink is supplied to the chart by a combination of syphoning action and capillary attraction at said tip.

3. In a recording instrument, a measuring device having a part movable in accordance with a variable quantity to be measured, a recording surface, a pen assembly mounted for rotation about an axis relative to said surface in accordance with movement of said part, an ink container spaced from said pen assembly, and means for supplying ink from said container to said pen assembly, said supply means including a tube formed of metalic spring material, said tube including a helical portion wound about an axis, said helical portion axis being mounted for movement along a predetermined and repetitious path in response to movements of said pen assembly said pen axis extending substantially transverse to the direction of spacing of adjacent turns of said helix.

4. In a recording instrument, a supporting structure, a measuring device carried by said supporting structure, said device having a part rotatable relative to said structure about an axis in accordance with a variable quantity to be measured, a recording surface, a pen assembly mounted for rotation relative to said structure and relative to said surface about said axis in accordance with rotation of said part, an ink container spaced from said pen assembly, and means for supplying ink from said container to said pen assembly, said supply means including a tube of resilient construction, at least a portion of said tube being disposed in the form of a helix wound about an axis, said helix axis lying along a path which is curved substantially about said pen axis, said tube having one end secured to said structure and the other end secured to the pen assembly for movement along a predetermined and repetitious path in response to movements of said pen assembly.

5. In a recording instrument, a supporting structure, a measuring device carried by said supporting structure, said device having a part rotatable relative to said structure about an axis in accordance with a variable quantity to be measured, a recording surface, a pen assembly mounted for rotation relative to said structure and relative to said surface about said axis in accordance with rotation of said part, an ink container spaced from said pen assembly, and means for supplying ink from said container to said pen assembly, said supply means including a tube of resilient construction, at least a portion of said tube being disposed in the form of a helix wound about an axis, said helix axis lying along a path which is curved substantially about said pen axis, said tube having one end secured to said structure and the other end secured to the pen assembly for movement along a predetermined and repetitious path in response to movements of said pen assembly, said ink container being positioned such that the ink level is slightly beneath the tip of the pen assembly, said tip having a capillary bore whereby ink is supplied to the chart by a combination of syphoning action and capillary attraction at said tip.

6. In a direct acting recording instrument, a measuring device including a rotor rotatable about a first axis in accordance with a variable quantity to be measured, a recording surface, a pen assembly directly secured to said rotor for rotation therewith about said axis relative to said surface, an ink container spaced from said pen assembly, tubing for supplying ink from said container to said pen assembly, said tubing including a resilient tube formed of metallic material and helically wound about a second axis, said tube being mounted for flexing movement of said second axis along a predetermined and repetitious path in response to movements of said pen assembly, said second axis being curved substantially about said first axis.

7. In a direct acting recording instrument, a measuring device including a rotor rotatable about an axis in accordance with a variable quantity to be measured, a recording surface, a pen assembly directly secured to said rotor for rotation therewith about said axis relative to said surface, an ink container spaced from said pen assembly, and means for supplying ink from said container to said pen assembly, said supply means including a tube of resilient construction, said tube including a helix portion wound about an axis, said helix axis being mounted for movement along a predetermined and repetitious path in response to movements of said pen assembly, said helix portion constituting a substantial part of said supply means.

8. In a direct acting recording instrument, a supporting structure, a measuring device carried by said supporting structure, said device including a rotor rotatable relative to said structure about an axis in accordance with a variable quantity to be measured, a recording surface, a pen assembly directly secured to said rotor for rotation therewith about said axis relative to said surface, an ink container spaced from said pen assembly, and means for supplying ink from said container to said pen assembly, said supply means including a tube wound in the form of a helix about an axis and formed of metallic spring material, said helix axis being curved substantially about said first named axis, said tube having one end secured to said structure and the other end secured to the pen assembly for movement in response to movements of said pen assembly.

References Cited in the file of this patent

UNITED STATES PATENTS

| | | |
|---|---|---|
| 467,053 | Sawyer | Jan. 12, 1892 |
| 1,615,230 | Orth | Jan. 25, 1927 |
| 1,904,615 | Bristol et al. | Apr. 18, 1933 |
| 2,176,777 | Tate | Oct. 17, 1939 |
| 2,466,691 | Daniels | Apr. 12, 1949 |
| 2,479,414 | Sanbonmatsu | Aug. 16, 1949 |
| 2,800,385 | Cannon | July 23, 1957 |
| 2,820,689 | Holloway | Jan. 21, 1958 |